(12) United States Patent
Furtado

(10) Patent No.: US 11,167,774 B2
(45) Date of Patent: Nov. 9, 2021

(54) METHODS AND SYSTEMS FOR PROVIDING NOTIFICATIONS AND WARNINGS

(71) Applicant: Indiev, Inc, Los Angeles, CA (US)

(72) Inventor: Diego Furtado, Los Angeles, CA (US)

(73) Assignee: INDIEV, INC, Los Angeles, CA (US)

( * ) Notice: Subject to any disclaimer, the term of this patent is extended or adjusted under 35 U.S.C. 154(b) by 92 days.

(21) Appl. No.: 16/789,000

(22) Filed: Feb. 12, 2020

(65) Prior Publication Data

US 2021/0245776 A1 Aug. 12, 2021

(51) Int. Cl.
*B60W 50/14* (2020.01)
*B60Q 1/52* (2006.01)
*B62D 15/02* (2006.01)
*F21S 10/06* (2006.01)
*B60K 35/00* (2006.01)

(52) U.S. Cl.
CPC ............ *B60W 50/14* (2013.01); *B60K 35/00* (2013.01); *B60Q 1/52* (2013.01); *B62D 15/0295* (2013.01); *F21S 10/06* (2013.01); *B60K 2370/782* (2019.05); *B60Q 2400/20* (2013.01); *B60W 2050/146* (2013.01)

(58) Field of Classification Search
CPC . B60W 50/14; B60W 2050/146; B60K 35/00; B60K 2370/782; B60Q 1/52; B60Q 2400/20; B62D 15/0295; F21S 10/06
See application file for complete search history.

(56) References Cited

U.S. PATENT DOCUMENTS

| | | | |
|---|---|---|---|
| 2012/0065877 A1* | 3/2012 | Jecker | H04N 7/181 701/300 |
| 2016/0205319 A1* | 7/2016 | Oota | E02F 9/261 348/38 |
| 2017/0166125 A1* | 6/2017 | Lisseman | B60Q 9/008 |
| 2019/0275888 A1* | 9/2019 | Kirsch | B60Q 9/008 |

* cited by examiner

*Primary Examiner* — Omeed Alizada
(74) *Attorney, Agent, or Firm* — Saliwanchik, Lloyd & Eisenschenk

(57) ABSTRACT

Methods and systems for providing Advanced Driver Assistance System (ADAS) warnings and/or other types of information to an occupant of a motor vehicle are provided. Warning lights can be provided around the perimeter of a shape that represents the perimeter of the vehicle from a top-view perspective. Lights around the shape can be lit to convey a sense of the area of danger and/or the direction from which danger is approaching.

17 Claims, 4 Drawing Sheets

METHODS AND SYSTEMS FOR PROVIDING NOTIFICATIONS AND WARNINGS

BACKGROUND

Operating a motor vehicle remains one of the more dangerous modes of transportation in modern society. With the prevalence of portable electronics such as smart phones, distracted drivers are becoming more common all the time. As such, it is important for a driver to remain aware of his or her surroundings when operating a motor vehicle. Advanced Driver Assistance Systems (ADAS) have been able to reduce the risk of injury and vehicle damage by assisting drivers with warnings and active controls. Modern vehicles typically have a multitude of ADASs and other features that provide audio and/or visual stimuli (e.g., warning message, light, and/or sound) so that the driver can, for example, react to dangerous situations. Automotive manufacturers continue to work to develop more and more ADAS features and to improve the performance of these features. However, this increasing multitude of warning messages and sounds can be confusing for the average driver.

BRIEF SUMMARY

Embodiments of the subject invention provide novel and advantageous methods and systems for providing Advanced Driver Assistance System (ADAS) warnings (and/or other types of information via visual and/or audio stimuli) to an occupant (e.g., a driver) of a motor vehicle (e.g., an electric vehicle (EV)) in a way that simplifies how the information is delivered. Warning lights can be provided around the perimeter of a shape that represents the perimeter of the vehicle from a top-view perspective. The shape can be, for example, a quadrilateral (with or without rounded corners), rounded shape (e.g., an oval, ellipse, or circle) or other polygon, so long as the shape represents the perimeter of the vehicle. Lights around the shape can be lit to convey a sense of the area of danger or the direction from which danger is approaching. A first color (e.g., white, green, or blue) lighting can be used to convey non-safety critical messages and/or notifications; a second color (e.g., yellow) lighting can be used to convey moderate danger; and a third color (e.g., red) lighting can be used to convey immediate or more serious danger.

In an embodiment, a system for providing warnings and notifications (to an occupant in a host vehicle) can comprise: a display comprising a shape that corresponds to an overhead view of the host vehicle, and perimeter lights around a perimeter of the shape, the perimeter lights respectively corresponding to areas of the host vehicle; a processor in operable communication with the display; and a storage medium in operable communication with the processor and having an application stored thereon that, when executed by the processor, causes the processor to: receive host vehicle information from the host vehicle; and send a notification to the display based on the host vehicle information received, causing at least one perimeter light of the display to light up in a manner that conveys notification information to the occupant of the vehicle based on the location of the at least one perimeter light.

In another embodiment, a display for providing warnings and notifications (to an occupant in a host vehicle) can comprise: a shape that corresponds to an overhead view of the host vehicle; and perimeter lights around a perimeter of the shape, the perimeter lights respectively corresponding to areas of the host vehicle. The display can be configured to receive (e.g., from a processor in operable communication with the display) a notification based on host vehicle information of the host vehicle, causing at least one perimeter light of the display to light up in a manner that conveys notification information to the occupant of the vehicle based on the location of the at least one perimeter light.

In another embodiment, a method for providing warnings and notifications (to an occupant in a host vehicle) can comprise: receiving, by a processor of the host vehicle, host vehicle information from the host vehicle; and sending, by the processor, a notification to a display of the host vehicle based on the host vehicle information received. The display can comprise a shape that corresponds to an overhead view of the host vehicle, and perimeter lights around a perimeter of the shape, the perimeter lights respectively corresponding to areas of the host vehicle. The sending of the notification to the display can cause at least one perimeter light of the display to light up in a manner that conveys notification information to the occupant of the vehicle based on the location of the at least one perimeter light.

DETAILED DESCRIPTION

Embodiments of the subject invention provide novel and advantageous methods and systems for providing Advanced Driver Assistance System (ADAS) warnings (and/or other types of information via visual and/or audio stimuli) to an occupant (e.g., a driver) of a vehicle (e.g., an electric vehicle (EV)) in a way that simplifies how the information is delivered. Warning lights can be provided around the perimeter of a shape that represents the perimeter of the vehicle from a top-view perspective. The shape can be, for example, a quadrilateral (with or without rounded corners), rounded shape (e.g., an oval, ellipse, or circle) or other polygon, so long as the shape represents the perimeter of the vehicle. Lights around the shape can be lit to convey a sense of the area of danger or the direction from which danger is approaching. A first color (e.g., white, green, or blue) lighting can be used to convey non-safety critical messages and/or notifications; a second color (e.g., yellow) lighting can be used to convey moderate danger; and a third color (e.g., red) lighting can be used to convey immediate or more serious danger. That is, the first color can be used to convey messages of low importance or no importance (e.g., in some embodiments the lights can be lit up with the first color as a default whenever the car is on and there is not moderate or serious danger).

The lighting around the shape is not limited to a specific number of perimeter lights. Here a "perimeter light" around the shape refers to a section of the perimeter of the shape that lights up at once (can be one light or a plurality of lights to light up the section). The shape can have, for example, 128, 64, 32, 16, 12, 8, 4, or 2 perimeter lights. Some perimeter lights can even be used to provide transitioning between colors (e.g., white perimeter lights can be present and then can fade into red (e.g., with a pinkish transition) for a zone of the vehicle for which immediate danger is to be conveyed). If 8 perimeter lights are present, they can respectively be, e.g., at the top, bottom, right side, left side, and the four corners of the shape to respectively represent the front, back, right side, left side, and the four corners of the vehicle. If 4 perimeter lights are present, they can respectively be, e.g., at the top/left, top/right, bottom/left, and bottom/right of the shape to respectively represent the top/left, top/right, bottom/left, and bottom/right of the vehicle. If 2 perimeter lights are present, they can respectively be, e.g., at the top/left and top/right of the shape to respectively represent the entire left and entire right of the vehicle.

Figure 2:
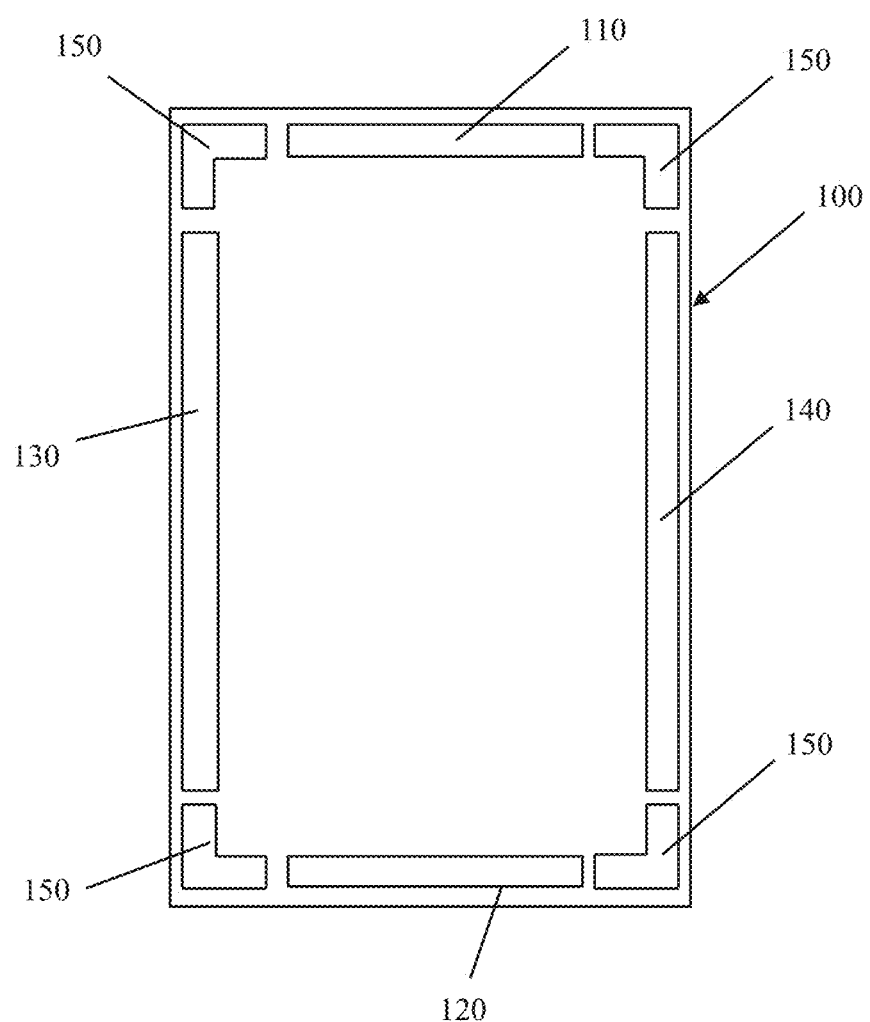
FIG. 2 shows a schematic view of a shape that can be used with a warning system of a vehicle, according to an embodiment of the subject invention.

FIG. 2 shows a schematic view of a shape that can be used with a warning system of a vehicle, according to an embodiment of the subject invention. Referring to FIG. 2, the shape 100 can include a plurality of perimeter lights 110,120,130, 140,150. The perimeter lights can include a top perimeter light 110, a bottom perimeter light 120, a left side perimeter light 130, and a right side perimeter light 140 to represent the front, back, left side, and right side, respectively, of the vehicle. The perimeter lights can also include corner perimeter lights 150 to respectively represent the appropriate corners (e.g., the corner perimeter light 150 where the top perimeter light 110 and the left side perimeter light 130 meet represents the front-left corner of the vehicle). The depiction in FIG. 2 is for exemplary purposes only and should not be construed as limiting; the relative sizes of the perimeter lights, with respect to each other and with respect to the overall shape 100, can vary, as can the quantity of perimeter lights.

More than one perimeter light can light up at once to convey that a warning is relevant to more than one area of the vehicle (or in the case of 2 perimeter lights at the top/left and top/right of the shape to indicate the entire front or the entire vehicle). For example, assume that 8 perimeter lights are respectively at the top, bottom, right side, left side, and the four corners of the shape to respectively represent the front, back, right side, left side, and the four corners of the vehicle. A threat to the entire rear of the vehicle may cause the bottom perimeter light and both bottom corner (bottom-left corner and bottom-right corner) perimeter lights to light up, while a threat to the entire left side of the vehicle may cause the left side perimeter light and both left side corner (bottom-left corner and top-left corner) perimeter lights to light up. A threat to the entire vehicle would cause all perimeter lights to light up regardless of the quantity of perimeter lights present.

In addition, when conveying an ADAS or other warning, the perimeter lights that light up (as appropriate, depending on the area of the vehicle affected) can flash, and the flashing can also convey the level of the threat. A first flashing speed can be used for low threat level; a second flashing speed faster than the first flashing speed can be used for a moderate threat level; and a third flashing speed faster than the second flashing speed can be used for an immediate/high threat/danger level. Most drivers will understand that lights flashing at a high, intermediate or low rate respectively convey a high, moderate, or low sense of urgency.

The shape can be displayed in any suitable manner, and any suitable type of lighting and/or mechanism for displaying the perimeter lights of the shape can be used. For example, physical light bulbs, light emitting diodes (LEDs), and/or a digital screen (e.g., one that uses software to change the pixel colors around the screen) can be used to illuminate the perimeter lights. Also, any geometric shape can be used for the shape representing the perimeter of the vehicle, including but not limited to shapes quadrilaterals, ellipses, ovals, rhomboids, or squares, and the shape can have rounded corner, non-90-degree angles, straight corners, 90-degree angles, or combinations thereof. The general shape need only convey a sense of the perimeter of the vehicle to occupants (e.g., the driver) thereof.

The shape representing the perimeter of the vehicle can be placed or displayed in any suitable location or surface, as long as it is visible to a driver of the vehicle. The shape can be on the steering wheel, the instrument cluster, the center display, the heads-up display, the rear-view mirror, a dedicated surface for providing warnings, and/or any other surface dedicated to the warning scheme. The warning scheme of the shape with perimeter lights can also work for remote controlled ADAS features that work with the driver outside of the vehicle. For example, the shape with perimeter lights can be used on a key-fob, a smartphone application (app), and/or any other device that is used to remotely control the vehicle, so long as a shape can be used to convey the perimeter of the vehicle.

If the surface on which the shape is disposed is dynamic, such as a surface that changes shape or can be configured to be a different shape, or a surface such as the steering wheel that has rotational movement, the perimeter lights can be made dynamic as to transition with the changing surface in order to remain representative of the vehicle's perimeter. For example, if the shape is on the steering wheel and the steering wheel turns, the steering wheel angle can be used as information to dynamically turn the shape with perimeter lights so that the top of the shape (e.g., the steering wheel) can always be used to represent the front of the vehicle even as the steering wheel is turned; the same goes for the sides, corners, and bottom of the steering wheel, or any other surface that is dynamic. In some embodiments the perimeter lights could alternatively be static on such a dynamic surface.

Figure 1:
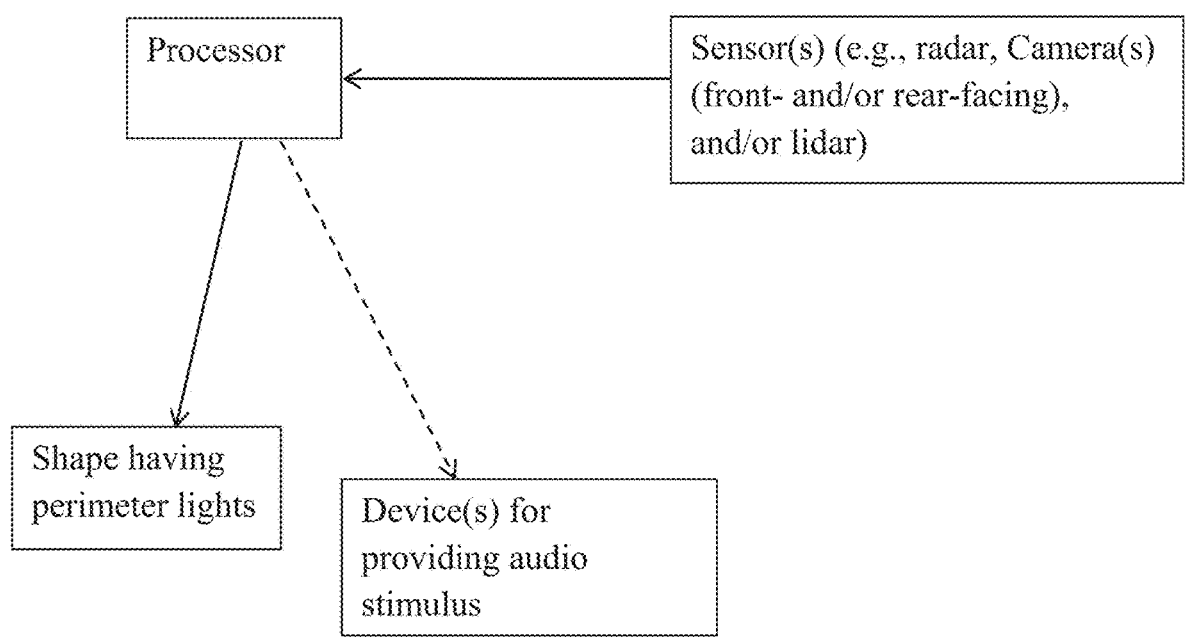
FIG. 1 shows a block diagram of elements of a warning system of a vehicle, according to an embodiment of the subject invention.

The system can also include one or more sensors of the vehicle (e.g., radar, one or more (front-, side-, and/or rear-facing) cameras, one or more ultrasonic sensors, one or more daylight sensors, one or more automatic headlight sensors, and/or lidar). The sensors can be in operable communication with a processor of the vehicle, and a storage medium in operable communication with the processor can have an application stored thereon that, when executed by the processor, causes the processor to illuminate (and/or flash) the perimeter lights appropriately based on the danger location and level, as well as (at least in some cases) provide an audio stimulus (e.g., one or more beeps). The processor can be in operable communication with the display having the shape that represents the perimeter of the vehicle, so that the processor can cause the lights to illuminate appropriately. The processor can also be in operable communication with at least one device that provides audio stimulus/stimuli (this can be the shape or a different device). This is represented schematically in FIG. 1.

The perimeter lights can have varying levels of brightness (e.g., at different times of the day). The brightness can be changed based on information from one or more sensors of the vehicle (e.g., one or more daylight sensors and/or one or more automatic headlight sensors) about lighting conditions inside the vehicle and/or outside the vehicle. The brightness of the perimeter lights can be adjusted accordingly (e.g., if it is dark outside and/or inside the vehicle, the brightness can be lowered). In the case that a vehicle does not have any daylight sensors or automatic headlight sensors, information from other parts of the vehicle (e.g., an indication that headlights have been manually turned on) can be used to estimate the lighting conditions inside the vehicle and/or outside the vehicle.

Modern vehicles have a multitude of visual and audio stimuli provided by ADAS and/or other features, and continue to add more and more sounds and messages, without providing enough information about the level of danger of the current situation. ADAS feature confusion and annoyance are major reasons that many drivers turn off ADAS features, as well as major contributors to consumer distrust of ADAS and related features. Embodiments of the subject invention address these issues by simplifying the mechanism of providing ADAS warnings (and/or other types of information via visual and/or audio stimuli) to a driver of a vehicle (e.g., an electric vehicle). The concept is intuitive to a driver or other vehicle occupant and can be tied into a variety of different ADAS and/or other vehicle features in general.

ADAS features provide another layer of safety for the drivers of modern motor vehicles, unless they are turned off by the driver due to annoyance, confusion, or discomfort. A major benefit of warning schemes of embodiments of the subject invention is due to the simplicity. The scheme reduces consumer annoyance and confusion and increases driver understanding and trust in ADASs. Most drivers will understand different colors representing different levels of danger and different frequency of flashing lights representing different levels of urgency. The shape with perimeter lights representing the perimeter of the vehicle as seen from above is also very intuitive and easy to comprehend. With the warning scheme, a driver does not need to remember what different sounds and/or symbols represent, nor does a driver need divert his or her attention to read messages on a screen. If a sound is made and/or one or more perimeter lights of the shape light(s) up, there is danger related to or coming from that section of the vehicle. Embodiments of the subject invention unify and simplify warnings while also decreasing reaction time of the driver, thereby increasing safety.

In addition, the warning and notification scheme of embodiments of the subject invention can be used for non-ADAS features and functions. These include but are not limited to infotainment functions (e.g., receiving phone calls or messages), alerting of tire pressure or other diagnostic trouble codes (DTCs), and/or showing a charge state during battery charging.

The methods, systems, and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals (i.e., computer-readable media can be referred to as non-transitory). A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A system for providing warnings and notifications (to an occupant in a host vehicle), the system comprising:

a display comprising a shape that corresponds to an overhead view of the host vehicle, and perimeter lights around a perimeter of the shape, the perimeter lights respectively corresponding to areas of the host vehicle;

a processor in operable communication with the display; and a storage medium in operable communication with the processor and having an application stored thereon that, when executed by the processor, causes the processor to:
  receive host vehicle information from the host vehicle; and
  send a notification to the display based on the host vehicle information received, causing at least one perimeter light of the display to light up in a manner that conveys notification information to the occupant of the vehicle based on the location of the at least one perimeter light.

Embodiment 2. The system according to embodiment 1, wherein the host vehicle is an electric vehicle.

Embodiment 3. The system according to any of embodiments 1-2, wherein the notification sent to the display is an Advanced Driver Assistance System (ADAS) warning.

Embodiment 4. The system according to any of embodiments 1-3, wherein the display comprises 2, 4, 8, 16, 64, or 128 perimeter lights.

Embodiment 5. The system according to any of embodiments 1-4, wherein the notification sent to the display causes the at least one perimeter light of the display to flash at a predetermined frequency.

Embodiment 6. The system according to embodiment 5, wherein the predetermined frequency is a first (slow) frequency if the notification is considered of low importance or no importance, wherein the predetermined frequency is a second (medium) frequency if the notification is considered of medium importance, and the predetermined frequency is a third (fast) frequency if the notification is considered of high importance.

Embodiment 7. The system according to any of embodiments 1-6, wherein the notification sent to the display also causes an audio alarm to be engaged within the host vehicle.

Embodiment 8. The system according to any of embodiments 1-7, wherein the notification sent to the display causes the at least one perimeter light of the display to light up as a predetermined color.

Embodiment 9. The system according to embodiment 8, wherein the predetermined color is a first color if the notification is considered of low importance or no importance, wherein the predetermined color is a second color if the notification is considered of medium importance, and the predetermined color is a third color if the notification is considered of high importance.

Embodiment 10. The system according to embodiment 9, wherein the second color is yellow, and wherein the third color is red.

Embodiment 11. The system according to any of embodiments 9-10, wherein the first color is white, green, or blue.

Embodiment 12. The system according to embodiment 11, wherein the first color is white or blue.

Embodiment 13. The system according to any of embodiments 1-12, wherein the shape has a geometric shape that is a quadrilateral, rounded-corner quadrilateral, oval, or ellipse.

Embodiment 14. The system according to embodiment 13, wherein the shape has a geometric shape that is a rounded-corner square or rounded-corner rectangle.

Embodiment 15. The system according to any of embodiments 1-14, wherein the perimeter lights comprise at least 8 perimeter lights comprising a first perimeter light at a top of the shape and representing a front of the host vehicle, a second perimeter light at a bottom of the shape and representing a back of the host vehicle, a third perimeter light at a left side of the shape and representing a left side of the host vehicle, a fourth perimeter light at a right side of the shape and representing a right side of the host vehicle, a fifth perimeter light at a top-left corner of the shape and representing a top-left corner of the host vehicle, a sixth perimeter light at a top-right corner of the shape and representing a top-right corner of the host vehicle, a seventh perimeter light at a bottom-left corner of the shape and representing a bottom-left corner of the host vehicle, and an eighth perimeter light at a bottom-right corner of the shape and representing a bottom-right corner of the host vehicle.

Embodiment 16. The system according to any of embodiments 1-15, wherein the notification sent to the display causes a plurality of the perimeter lights of the display to light up to convey that the notification information is relevant to more than one area of the host vehicle.

Embodiment 17. The system according to any of embodiments 1-16, wherein each of the perimeter lights comprises at least one light bulb, at least one light emitting diode (LED), and/or a plurality of pixels on a digital screen.

Embodiment 18. The system according to any of embodiments 1-17, wherein the display is disposed within the host vehicle.

Embodiment 19. The system according to embodiment 18, wherein the display is disposed on a steering wheel, an instrument cluster, a center display, a heads-up display, a rear-view mirror, or a dedicated surface for providing warnings.

Embodiment 20. The system according to any of embodiments 1-17, wherein the display is disposed on a key-fob, a smartphone screen, and/or another device that is configured to remotely control the host vehicle.

Embodiment 21. The system according to any of embodiments 1-20, wherein the display is disposed on a dynamic surface such that a rotational position, an absolute position, or both of the shape changes, and wherein the system is configured such that the perimeter lights are dynamic such that the perimeter lights transition with the dynamic surface such that the perimeter lights always respectively represent areas of the host vehicle based on a view of the shape by the occupant (e.g., such that the top of the shape always represents the front of the vehicle and so on, even if the display is on the steering wheel and the steering wheel rotates).

Embodiment 22. The system according to any of embodiments 1-21, further comprising at least one sensor in operable communication with the processor, the at least one sensor being configured to obtain the host vehicle information and provide the host vehicle information to the processor.

Embodiment 23. The system according to embodiment 22, wherein the at least one sensor comprises at least one of radar, a front-facing camera, a rear-facing camera, a side-facing camera, an ultrasonic sensor, a daylight sensor, an automatic headlight sensor, and lidar.

Embodiment 24. A display for providing warnings and notifications (to an occupant in a host vehicle), the display comprising:

a shape that corresponds to an overhead view of the host vehicle; and perimeter lights around a perimeter of the shape, the perimeter lights respectively corresponding to areas of the host vehicle, wherein the display is configured to receive (e.g., from a processor in operable communication with the display) a notification based on host vehicle information of the host vehicle, causing at least one perimeter light of the display to light up in a manner that conveys notification information to the occupant of the vehicle based on the location of the at least one perimeter light.

Embodiment 25. The display according to embodiment 24, wherein the host vehicle is an electric vehicle.

Embodiment 26. The display according to any of embodiments 24-25, wherein the notification is an Advanced Driver Assistance System (ADAS) warning.

Embodiment 27. The display according to any of embodiments 24-26, wherein the display comprises 2, 4, 8, 16, 64, or 128 perimeter lights.

Embodiment 28. The display according to any of embodiments 24-27, wherein the notification causes the at least one perimeter light of the display to flash at a predetermined frequency.

Embodiment 29. The display according to embodiment 28, wherein the predetermined frequency is a first (slow) frequency if the notification is considered of low importance or no importance, wherein the predetermined frequency is a second (medium) frequency if the notification is considered of medium importance, and the predetermined frequency is a third (fast) frequency if the notification is considered of high importance.

Embodiment 30. The display according to any of embodiments 24-29, wherein the notification also causes an audio alarm to be engaged within the host vehicle.

Embodiment 31. The display according to any of embodiments 24-30, wherein the notification causes the at least one perimeter light of the shape to light up as a predetermined color.

Embodiment 32. The display according to embodiment 31, wherein the predetermined color is a first color if the notification is considered of low importance or no importance, wherein the predetermined color is a second color if the notification is considered of medium importance, and the predetermined color is a third color if the notification is considered of high importance.

Embodiment 33. The display according to embodiment 32, wherein the second color is yellow, and wherein the third color is red.

Embodiment 34. The display according to any of embodiments 32-33, wherein the first color is white, green, or blue.

Embodiment 35. The display according to embodiment 34, wherein the first color is white or blue.

Embodiment 36. The display according to any of embodiments 24-35, wherein the shape has a geometric shape that is a quadrilateral, rounded-corner quadrilateral, oval, or ellipse.

Embodiment 37. The display according to embodiment 36, wherein the shape has a geometric shape that is a rounded-corner square or rounded-corner rectangle.

Embodiment 38. The display according to any of embodiments 24-37, wherein the perimeter lights comprise at least 8 perimeter lights comprising a first perimeter light at a top of the shape and representing a front of the host vehicle, a second perimeter light at a bottom of the shape and representing a back of the host vehicle, a third perimeter light at a left side of the shape and representing a left side of the host vehicle, a fourth perimeter light at a right side of the shape and representing a right side of the host vehicle, a fifth perimeter light at a top-left corner of the shape and representing a top-left corner of the host vehicle, a sixth perimeter light at a top-right corner of the shape and representing a top-right corner of the host vehicle, a seventh perimeter light at a bottom-left corner of the shape and representing a bottom-left corner of the host vehicle, and an eighth perimeter light at a bottom-right corner of the shape and representing a bottom-right corner of the host vehicle.

Embodiment 39. The display according to any of embodiments 24-38, wherein the notification causes a plurality of the perimeter lights of the shape to light up to convey that the notification information is relevant to more than one area of the host vehicle.

Embodiment 40. The display according to any of embodiments 24-39, wherein each of the perimeter lights comprises at least one light bulb, at least one light emitting diode (LED), and/or a plurality of pixels on a digital screen.

Embodiment 41. The display according to any of embodiments 24-40, wherein the display is disposed on a dynamic surface such that a rotational position, an absolute position, or both of the shape changes, and
wherein the display is configured such that the perimeter lights are dynamic such that the perimeter lights transition with the dynamic surface such that the perimeter lights always respectively represent areas of the host vehicle based on a view of the shape by the occupant (e.g., such that the top of the shape always represents the front of the vehicle and so on, even if the display is on the steering wheel and the steering wheel rotates).

Embodiment 42. A motor vehicle, comprising the system according to any of embodiments 1-23.

Embodiment 43. The motor vehicle according to embodiment 24, wherein the motor vehicle is an electric vehicle.

Embodiment 44. A motor vehicle, comprising the display according to any of embodiments 24-41.

Embodiment 45. The motor vehicle according to embodiment 44, wherein the motor vehicle is an electric vehicle.

Embodiment 46. A method for providing warnings and notifications (to an occupant in a host vehicle), the method comprising:
receiving, by a processor of the host vehicle, host vehicle information from the host vehicle; and
sending, by the processor, a notification to a display of the host vehicle based on the host vehicle information received,
wherein the display comprises a shape that corresponds to an overhead view of the host vehicle, and perimeter lights around a perimeter of the shape, the perimeter lights respectively corresponding to areas of the host vehicle, and
wherein the sending of the notification to the display causes at least one perimeter light of the display to light up in a manner that conveys notification information to the occupant of the vehicle based on the location of the at least one perimeter light.

Embodiment 47. The method according to embodiment 46, wherein the host vehicle is an electric vehicle.

Embodiment 48. The method according to any of embodiments 46-47, wherein the notification sent to the display is an Advanced Driver Assistance System (ADAS) warning.

Embodiment 49. The method according to any of embodiments 46-48, wherein the display comprises 2, 4, 8, 16, 64, or 128 perimeter lights.

Embodiment 50. The method according to any of embodiments 46-49, wherein the notification sent to the display causes the at least one perimeter light of the display to flash at a predetermined frequency.

Embodiment 51. The method according to embodiment 50, wherein the predetermined frequency is a first (slow) frequency if the notification is considered of low importance or no importance, wherein the predetermined frequency is a second (medium) frequency if the notification is considered of medium importance, and the predetermined frequency is a third (fast) frequency if the notification is considered of high importance.

Embodiment 52. The method according to any of embodiments 46-51, wherein the notification sent to the display also causes an audio alarm to be engaged within the host vehicle.

Embodiment 53. The method according to any of embodiments 46-52, wherein the notification sent to the display causes the at least one perimeter light of the display to light up as a predetermined color.

Embodiment 54. The method according to embodiment 52, wherein the predetermined color is a first color if the notification is considered of low importance or no importance, wherein the predetermined color is a second color if the notification is considered of medium importance, and the predetermined color is a third color if the notification is considered of high importance.

Embodiment 55. The method according to embodiment 54, wherein the second color is yellow, and wherein the third color is red.

Embodiment 56. The method according to any of embodiments 54-55, wherein the first color is white, green, or blue.

Embodiment 57. The method according to embodiment 56, wherein the first color is white or blue.

Embodiment 58. The method according to any of embodiments 46-57, wherein the shape has a geometric shape that is a quadrilateral, rounded-corner quadrilateral, oval, or ellipse.

Embodiment 59. The method according to embodiment 58, wherein the shape has a geometric shape that is a rounded-corner square or rounded-corner rectangle.

Embodiment 60. The method according to any of embodiments 46-59, wherein the perimeter lights comprise at least 8 perimeter lights comprising a first perimeter light at a top of the shape and representing a front of the host vehicle, a second perimeter light at a bottom of the shape and representing a back of the host vehicle, a third perimeter light at a left side of the shape and representing a left side of the host vehicle, a fourth perimeter light at a right side of the shape and representing a right side of the host vehicle, a fifth perimeter light at a top-left corner of the shape and representing a top-left corner of the host vehicle, a sixth perimeter light at a top-right corner of the shape and representing a top-right corner of the host vehicle, a seventh perimeter light at a bottom-left corner of the shape and representing a bottom-left corner of the host vehicle, and an eighth perimeter light at a bottom-right corner of the shape and representing a bottom-right corner of the host vehicle.

Embodiment 61. The method according to any of embodiments 46-60, wherein the notification sent to the display causes a plurality of the perimeter lights of the display to light up to convey that the notification information is relevant to more than one area of the host vehicle.

Embodiment 62. The method according to any of embodiments 46-61, wherein each of the perimeter lights comprises at least one light bulb, at least one light emitting diode (LED), and/or a plurality of pixels on a digital screen.

Embodiment 63. The method according to any of embodiments 46-62, wherein the display is disposed within the host vehicle.

Embodiment 64. The method according to embodiment 63, wherein the display is disposed on a steering wheel, an instrument cluster, a center display, a heads-up display, or a dedicated surface for providing warnings.

Embodiment 65. The method according to any of embodiments 46-62, wherein the display is disposed on a key-fob, a smartphone screen, and/or another device that is configured to remotely control the host vehicle.

Embodiment 66. The method according to any of embodiments 46-65, wherein the display is disposed on a dynamic surface such that a rotational position, an absolute position, or both of the shape changes, and
wherein the system is configured such that the perimeter lights are dynamic such that the perimeter lights transition with the dynamic surface such that the perimeter lights always respectively represent areas of the host vehicle based on a view of the shape by the occupant (e.g., such that the top of the shape always represents the front of the vehicle and so on, even if the display is on the steering wheel and the steering wheel rotates).

Embodiment 67. The method according to any of embodiments 46-66, wherein the host vehicle information is received by the processor from at least one sensor in operable communication with the processor.

Embodiment 68. The method according to embodiment 67, wherein the at least one sensor comprises at least one of radar, a front-facing camera, a rear-facing camera, a side-facing camera, an ultrasonic sensor, a daylight sensor, an automatic headlight sensor, and lidar.

Embodiment 69. The system according to any of embodiments 1-23, wherein the display is configured such that a brightness level of the perimeter lights varies based on lighting conditions inside and/or outside the host vehicle (e.g., lighting conditions can be based on one or more daylight sensors and/or one or more automatic headlight sensors and/or an indication that headlights of the host vehicle have been manually turned on).

Embodiment 70. The display according to any of embodiments 24-41, wherein the display is configured such that a brightness level of the perimeter lights varies based on lighting conditions inside and/or outside the host vehicle (e.g., lighting conditions can be based on one or more daylight sensors and/or one or more automatic headlight sensors and/or an indication that headlights of the host vehicle have been manually turned on).

Embodiment 71. The motor vehicle according to any of embodiments 42-45, wherein the display is configured such that a brightness level of the perimeter lights varies based on lighting conditions inside and/or outside the (host) motor vehicle (e.g., lighting conditions can be based on one or more daylight sensors and/or one or more automatic headlight sensors and/or an indication that headlights of the (host) motor vehicle have been manually turned on).

Embodiment 72. The method according to any of embodiments 46-68, wherein the display is configured such that a brightness level of the perimeter lights varies based on lighting conditions inside and/or outside the host vehicle (e.g., lighting conditions can be based on one or more daylight sensors and/or one or more automatic headlight sensors and/or an indication that headlights of the host vehicle have been manually turned on).

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to the invention.

The examples present scenarios to help demonstrate how a warning scheme shape would light up for different ADAS and other vehicle features. Scenarios are presented with respect to a 2-perimeter-light shape and a 4-perimeter light shape, and these are presented for exemplary purposes only and should not be construed as limiting. Other quantities and arrangements of perimeter lights can be used, as discussed and contemplated herein. Also, any sequence demonstrated for the left side can be translated to the right side as well.

Example 1—Lane Keep Assist/Lane Departure Warning

Figure 3A:
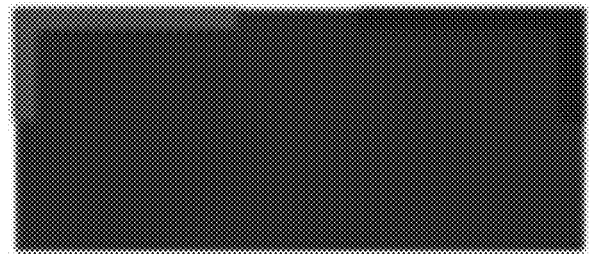
FIG. 3A shows an example of a shape that can be used with a warning system of a vehicle, according to an embodiment of the subject invention.
Figure 3B:
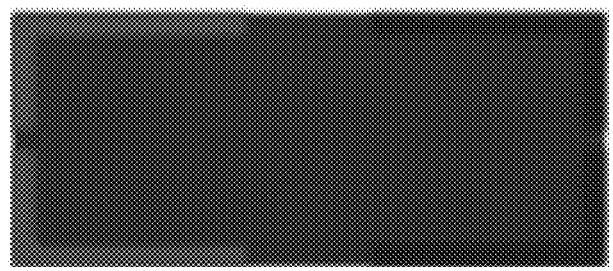
FIG. 3B shows an example of a shape that can be used with a warning system of a vehicle, according to an embodiment of the subject invention.

Scenario—left lane departure.
2-perimeter-light shape—the left perimeter light can flash during lane departure (e.g., a set number of times, such as three or less), with optional audio that can be disabled by the driver (either ahead of time or at that time). FIG. 3A shows an example positioning of such left perimeter light. The light can flash, for example, red. Light stops flashing if vehicle returns to lane.
4-perimeter-light shape—the same response as with the 2-perimeter-light shape, but the two left perimeter lights can flash. FIG. 3B shows an example positioning of such left perimeter lights.

Figure 3C:
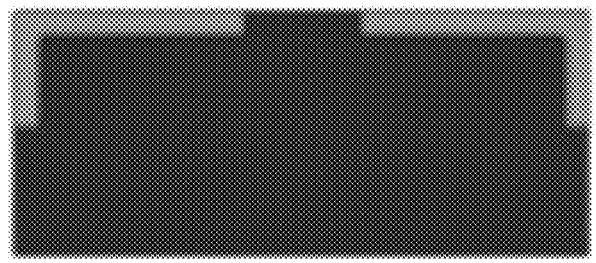
FIG. 3C shows an example of a shape that can be used with a warning system of a vehicle, according to an embodiment of the subject invention.
Figure 3D:
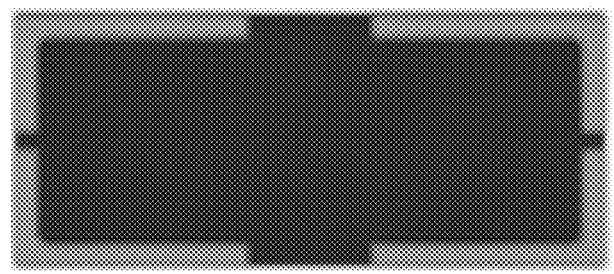
FIG. 3D shows an example of a shape that can be used with a warning system of a vehicle, according to an embodiment of the subject invention.

Scenario—driver has hands off the wheel for a longer time than pre-determined first threshold.
2-perimeter-light shape—both (all) perimeter lights can flash at a low frequency with a hands-on warning message displayed until either hands are returned to the wheel or a pre-determined second threshold of time is reached. The lights can flash, for example, yellow. FIG. 3C shows an example positioning of such lights.
4-perimeter-light shape—the same response as with the 2-perimeter-light shape, but all four perimeter lights can flash. FIG. 3D shows an example positioning of such lights.

Scenario—driver has hands off the wheel for a longer time than pre-determined second threshold.

2-perimeter-light shape—both (all) perimeter lights can flash at a low frequency with a hands-on warning message displayed until either hands are returned to the wheel or a pre-determined third threshold of time is reached. The lights can flash, for example, red. FIG. 3C shows an example positioning of such lights.

4-perimeter-light shape—the same response as with the 2-perimeter-light shape, but all four perimeter lights can flash. FIG. 3D shows an example positioning of such lights.

Scenario—driver has hands off the wheel for a longer time than pre-determined third threshold.

2-perimeter-light shape—both (all) perimeter lights can flash at a high frequency with a hands-on warning message displayed and/or an audio alarm until either hands are returned to the wheel or a pre-determined system disengage threshold of time is reached. The lights can flash, for example, red. FIG. 3C shows an example positioning of such lights.

4-perimeter-light shape—the same response as with the 2-perimeter-light shape, but all four perimeter lights can flash. FIG. 3D shows an example positioning of such lights.

Example 2—Forward Collision Warning/Automatic Emergency Braking (AEB)

Scenario—a predetermined forward collision warning time-to-collision threshold is reached.

2-perimeter-light shape—both (all) perimeter lights can flash at a high frequency with an optional audio alarm (that can be disabled by the driver either ahead of time of at that time) until a predetermined AEB threshold is reached or the forward collision warning time-to-collision is no longer at or below the threshold. The lights can flash, for example, yellow. FIG. 3C shows an example positioning of such lights.

4-perimeter-light shape—the same response as with the 2-perimeter-light shape, but all four perimeter lights can flash. FIG. 3D shows an example positioning of such lights.

Scenario—predetermined AEB threshold is reached (e.g., because forward collision warning was ignored, or because it was just reached quickly before forward collision warning could be activated).

2-perimeter-light shape—both (all) perimeter lights can flash at a high frequency with an audio alarm (that cannot be disabled) until a predetermined sequence takes place (e.g., AEB is engaged and/or the system determines a collision is no longer a threat). The lights can flash, for example, red. FIG. 3C shows an example positioning of such lights.

4-perimeter-light shape—the same response as with the 2-perimeter-light shape, but all four perimeter lights can flash. FIG. 3D shows an example positioning of such lights.

Example 3—Blind Spot Warning/Lane Change Warning

Scenario—Left turn signal is engaged in order to change to the left lane, but there is a vehicle detected in the blind spot.

2-perimeter-light shape—left perimeter light can flash at a medium frequency with an optional audio alarm (that can be disabled by the driver either ahead of time of at that time); a left mirror LED can also flash. The light can flash, for example, yellow. FIG. 3A shows an example positioning of such a light.

4-perimeter-light shape—the same response as with the 2-perimeter-light shape, but the two left perimeter lights can flash. FIG. 3B shows an example positioning of such left perimeter lights.

Scenario—Left turn signal is engaged in order to change to the left lane, but there is a vehicle detected approaching the blind spot with a time-to-collision that is less than a predetermined lane change warning threshold.

2-perimeter-light shape—left perimeter light can flash at a medium frequency with an optional audio alarm (that can be disabled by the driver either ahead of time of at that time); a left mirror LED can also flash. The light can flash, for example, yellow. FIG. 3A shows an example positioning of such a light.

4-perimeter-light shape—the same response as with the 2-perimeter-light shape, but the two left perimeter lights can flash. FIG. 3B shows an example positioning of such left perimeter lights.

Example 4—Rear Cross Traffic Alert (RCTA)/Front Cross Traffic Alert (FCTA)

Scenario—The gear is put in reverse showing the driver's intent to go in reverse, but there is a vehicle in the RCTA zone, and it is approaching from the left.

2-perimeter-light shape—left perimeter light can flash with an optional audio alarm (that can be disabled by the driver either ahead of time of at that time) until the vehicle is no longer in the RCTA zone. The light can flash, for example, yellow. FIG. 3A shows an example positioning of such a light.

4-perimeter-light shape—the same response as with the 2-perimeter-light shape, but the two left perimeter lights can flash. FIG. 3B shows an example positioning of such left perimeter lights.

Scenario—The gear is put in reverse and the car is moving in reverse, but there is a vehicle in the RCTA zone, and it is approaching from the left.

2-perimeter-light shape—both (all) perimeter lights can flash at a high frequency with an audio alarm (that cannot be disabled) until a predetermined sequence takes place (e.g., an emergency stop). The lights can flash, for example, red. FIG. 3C shows an example positioning of such lights.

4-perimeter-light shape—the same response as with the 2-perimeter-light shape, but all four perimeter lights can flash. FIG. 3D shows an example positioning of such lights.

Scenario—The gear is put in drive showing the driver's intent to go forward, but there is a vehicle in the FCTA zone, and it is approaching from the left.

2-perimeter-light shape—the left perimeter light can flash with an optional audio alarm (that can be disabled by the driver either ahead of time of at that time) until the vehicle is no longer in the FCTA zone. The light can flash, for example, yellow. FIG. 3A shows an example positioning of such a light.

4-perimeter-light shape—the same response as with the 2-perimeter-light shape, but the two left perimeter lights can flash. FIG. 3B shows an example positioning of such left perimeter lights.

Scenario—The gear is put in drive and the car is moving forward, but there is a vehicle in the FCTA zone, and it is approaching from the left.

2-perimeter-light shape—both (all) perimeter lights can flash at a high frequency with an audio alarm (that cannot be disabled) until a predetermined sequence takes place (e.g., an emergency stop). The lights can flash, for example, red. FIG. 3C shows an example positioning of such lights.

4-perimeter-light shape—the same response as with the 2-perimeter-light shape, but all four perimeter lights can flash. FIG. 3D shows an example positioning of such lights.

Example 5—Parking Collision Warning

Scenario—The car is moving in reverse and gets close to an object or person on the left side of the vehicle (e.g., as detected by sensors of the vehicle).

2-perimeter-light shape—left perimeter light can flash at a low frequency with an optional audio alarm (that can be disabled by the driver either ahead of time of at that time) until the vehicle is no longer close to the object or person. The light can flash, for example, yellow. FIG. 3A shows an example positioning of such a light.

Figure 3E:
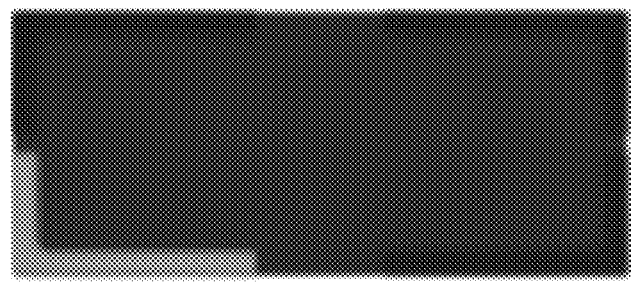
FIG. 3E shows an example of a shape that can be used with a warning system of a vehicle, according to an embodiment of the subject invention.

4-perimeter-light shape—the same response as with the 2-perimeter-light shape, but the bottom-left perimeter light can flash. FIG. 3E shows an example positioning of such a light.

Scenario—The car is moving in reverse and gets very close (e.g., within a lower distance threshold than with the previous scenario) to an object or person on the left side of the vehicle (e.g., as detected by sensors of the vehicle).

2-perimeter-light shape—left perimeter light can flash at a medium frequency with an optional audio alarm (that can be disabled by the driver either ahead of time of at that time) until the vehicle is no longer very close to the object or person. The light can flash, for example, red. FIG. 3A shows an example positioning of such a light.

4-perimeter-light shape—the same response as with the 2-perimeter-light shape, but the bottom-left perimeter light can flash. FIG. 3E shows an example positioning of such a light.

Scenario—The car is moving in reverse and gets very close (e.g., within a lower distance threshold than with the previous scenario) to an object or person on the left side of the vehicle (e.g., as detected by sensors of the vehicle) and then continues going in reverse and reaches a predetermined braking threshold (e.g., distance or time-to-collision).

2-perimeter-light shape—both (all) perimeter lights can flash at a high frequency with an audio alarm (that cannot be disabled) until a predetermined sequence takes place (e.g., an emergency stop). The lights can flash, for example, red. FIG. 3C shows an example positioning of such lights.

4-perimeter-light shape—the same response as with the 2-perimeter-light shape, but all four perimeter lights can flash. FIG. 3D shows an example positioning of such lights.

Example 6—Driver Attention Warning (DAW)

Scenario—The driver (who may be, for example, on a long road trip) has shown signs of drowsiness as detected by a DAW system of the vehicle, such that the DAW attention level has reached a predetermined threshold (e.g., a level of 0).

2-perimeter-light shape—both (all) perimeter lights can flash at a low frequency with an optional audio alarm (that can be disabled by the driver either ahead of time of at that time) and a DAW message displayed. The lights can flash, for example, yellow. FIG. 3C shows an example positioning of such lights.

4-perimeter-light shape—the same response as with the 2-perimeter-light shape, but all four perimeter lights can flash. FIG. 3D shows an example positioning of such lights.

Scenario—The driver has shown signs of drowsiness as detected by the DAW system and has previously been warned based on the DAW system during the same trip.

2-perimeter-light shape—both (all) perimeter lights can flash at a low frequency with an optional audio alarm (that can be disabled by the driver either ahead of time of at that time) and a DAW message displayed. The lights can flash, for example, red. FIG. 3C shows an example positioning of such lights.

4-perimeter-light shape—the same response as with the 2-perimeter-light shape, but all four perimeter lights can flash. FIG. 3D shows an example positioning of such lights.

Example 7—Left Turn Assist/Right Turn Assist

Scenario—The vehicle is waiting at an intersection to make a left turn, but there is an object (e.g., a truck) obstructing the driver's view of oncoming traffic, and the vehicle stars pulling forward with steering input. The left/right turn assist (LRTA) system senses an oncoming vehicle is approaching with a time-to-collision that is less than a predetermined warning threshold.

2-perimeter-light shape—both (all) perimeter lights can flash at a high frequency with an optional audio alarm (that can be disabled by the driver either ahead of time of at that time).

The lights can flash, for example, yellow. FIG. 3C shows an example positioning of such lights.

4-perimeter-light shape—the same response as with the 2-perimeter-light shape, but all four perimeter lights can flash. FIG. 3D shows an example positioning of such lights.

Scenario—The vehicle is waiting at an intersection to make a left turn, but there is an object (e.g., a truck) obstructing the driver's view of oncoming traffic, and the vehicle stars pulling forward with steering input. The left/right turn assist (LRTA) system senses an oncoming vehicle is approaching with a time-to-collision that is less than a predetermined AEB threshold.

2-perimeter-light shape—both (all) perimeter lights can flash at a high frequency with an audio alarm (that cannot be disabled) until a predetermined sequence takes place (e.g., an emergency stop). The lights can flash, for example, red. FIG. 3C shows an example positioning of such lights.

4-perimeter-light shape—the same response as with the 2-perimeter-light shape, but all four perimeter lights can flash. FIG. 3D shows an example positioning of such lights.

Example 8—Non-ADAS-Related Notification

Scenario—The vehicle is at a charging station and is in the process of charging, with a current charge of less than a first threshold (e.g., 25%).

2-perimeter-light shape—both (all) perimeter lights can flash at a low frequency until the first threshold of charge is reached or until the vehicle is no longer being charged. The lights can flash, for example, red. FIG. 3C shows an example positioning of such lights.

4-perimeter-light shape—the same response as with the 2-perimeter-light shape, but all four perimeter lights can flash. FIG. 3D shows an example positioning of such lights.

Scenario—The vehicle is at a charging station and is in the process of charging, with a current charge greater than the first threshold and less than a second threshold (e.g., 75% or 80%).

2-perimeter-light shape—both (all) perimeter lights can flash at a low frequency until a full charge is reached or until the vehicle is no longer being charged. The lights can flash, for example, yellow. FIG. 3C shows an example positioning of such lights.

4-perimeter-light shape—the same response as with the 2-perimeter-light shape, but all four perimeter lights can flash. FIG. 3D shows an example positioning of such lights.

Scenario—The vehicle is at a charging station and is in the process of charging, with a current full charge.

2-perimeter-light shape—both (all) perimeter lights can flash at a low frequency until the vehicle is no longer plugged in at the charging station. The lights can flash, for example, green. FIG. 3C shows an example positioning of such lights.

4-perimeter-light shape—the same response as with the 2-perimeter-light shape, but all four perimeter lights can flash. FIG. 3D shows an example positioning of such lights.

Scenario—The vehicle receives a phone call or other non-urgent and non-ADAS-related notification.

2-perimeter-light shape—both (all) perimeter lights can flash at a low frequency for a predetermined amount of time set based on the type of notification. The lights can flash, for example, white so that the driver's attention can be pulled to view the message once it is safe for the driver to avert his or her attention. FIG. 3C shows an example positioning of such lights.

4-perimeter-light shape—the same response as with the 2-perimeter-light shape, but all four perimeter lights can flash. FIG. 3D shows an example positioning of such lights.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for providing warnings and notifications to an occupant in a host vehicle, the system comprising:
   a display comprising a shape that corresponds to an overhead view of the host vehicle, and perimeter lights around a perimeter of the shape, the perimeter lights respectively corresponding to areas of the host vehicle;
   a processor in operable communication with the display; and a storage medium in operable communication with the processor and having an application stored thereon that, when executed by the processor, causes the processor to:
   receive host vehicle information from the host vehicle; and send a notification to the display based on the host vehicle information received, causing at least one perimeter light of the display to light up in a manner that conveys notification information to the occupant of the vehicle based on the location of the at least one perimeter light;
   wherein the perimeter lights comprise at least 8 perimeter lights comprising a first perimeter light at a top of the shape and representing a front of the host vehicle, a second perimeter light at a bottom of the shape and representing a back of the host vehicle, a third perimeter light at a left side of the shape and representing a left side of the host vehicle, a fourth perimeter light at a right side of the shape and representing a right side of the host vehicle, a fifth perimeter light at a top-left corner of the shape and representing a top-left corner of the host vehicle, a sixth perimeter light at a top-right corner of the shape and representing a top-right corner of the host vehicle, a seventh perimeter light at a bottom-left corner of the shape and representing a bottom-left corner of the host vehicle, and an eighth perimeter light at a bottom-right corner of the shape and representing a bottom-right corner of the host vehicle.

2. The system according to claim 1, wherein the host vehicle is an electric vehicle.

3. The system according to claim 1, wherein the display comprises exactly 8, exactly 16, exactly 64, or exactly 128 perimeter lights.

4. The system according to claim 1, wherein the notification sent to the display is an Advanced Driver Assistance System (ADAS) warning,
   wherein the notification sent to the display causes the at least one perimeter light of the display to flash at a predetermined frequency,
   wherein the predetermined frequency is a first frequency if the notification is considered of low importance or no importance, wherein the predetermined frequency is a second frequency if the notification is considered of medium importance, and the predetermined frequency is a third frequency if the notification is considered of high importance, and
   wherein the second frequency is faster than the first frequency, and the third frequency is faster than the second frequency.

5. The system according to claim 1, wherein the notification sent to the display causes the at least one perimeter light of the display to light up as a predetermined color,
   wherein the predetermined color is a first color if the notification is considered of low importance or no importance, wherein the predetermined color is a second color if the notification is considered of medium importance, and the predetermined color is a third color if the notification is considered of high importance,
   wherein the second color is yellow, and
   wherein the third color is red.

6. The system according to claim 1, wherein the shape has a geometric shape that is a quadrilateral, rounded-corner quadrilateral, oval, or ellipse.

7. The system according to claim 1, wherein the notification sent to the display causes a plurality of the perimeter lights of the display to light up to convey that the notification information is relevant to more than one area of the host vehicle.

8. The system according to claim 1, wherein the display is disposed on a steering wheel of the host vehicle, an instrument cluster of the host vehicle, a center display of the host vehicle, a heads-up display of the host vehicle, a dedicated surface of the host vehicle for providing warnings, a key-fob, or a smartphone screen.

9. The system according to claim 1, wherein the display is disposed on a dynamic surface such that a rotational position, an absolute position, or both of the shape changes, and
   wherein the system is configured such that the perimeter lights are dynamic such that the perimeter lights transition with the dynamic surface such that the perimeter lights always respectively represent areas of the host vehicle based on a view of the shape by the occupant.

10. The system according to claim 1, further comprising at least one sensor in operable communication with the processor, the at least one sensor being configured to obtain the host vehicle information and provide the host vehicle information to the processor, and
    wherein the at least one sensor comprises at least one of radar, a front-facing camera, a rear-facing camera, a side-facing camera, an ultrasonic sensor, a daylight sensor, an automatic headlight sensor, and lidar.

11. A display for providing warnings and notifications to an occupant in a host vehicle, the display comprising:
- a shape that corresponds to an overhead view of the host vehicle; and
- perimeter lights around a perimeter of the shape, the perimeter lights respectively corresponding to areas of the host vehicle, wherein the display is configured to receive a notification based on host vehicle information of the host vehicle, causing at least one perimeter light of the display to light up in a manner that conveys notification information to the occupant of the vehicle based on the location of the at least one perimeter light;
- wherein the perimeter lights comprise at least 8 perimeter lights comprising a first perimeter light at a top of the shape and representing a front of the host vehicle, a second perimeter light at a bottom of the shape and representing a back of the host vehicle, a third perimeter light at a left side of the shape and representing a left side of the host vehicle, a fourth perimeter light at a right side of the shape and representing a right side of the host vehicle, a fifth perimeter light at a top-left corner of the shape and representing a top-left corner of the host vehicle, a sixth perimeter light at a top-right corner of the shape and representing a top-right corner of the host vehicle, a seventh perimeter light at a bottom-left corner of the shape and representing a bottom-left corner of the host vehicle, and an eighth perimeter light at a bottom-right corner of the shape and representing a bottom-right corner of the host vehicle.

12. The display according to claim 11, wherein the host vehicle is an electric vehicle.

13. The display according to claim 11, wherein the notification sent to the display is an Advanced Driver Assistance System (ADAS) warning,
- wherein the notification causes the at least one perimeter light of the display to flash at a predetermined frequency,
- wherein the predetermined frequency is a first frequency if the notification is considered of low importance or no importance, wherein the predetermined frequency is a second frequency if the notification is considered of medium importance, and the predetermined frequency is a third frequency if the notification is considered of high importance,
- wherein the second frequency is faster than the first frequency, and the third frequency is faster than the second frequency,
- wherein the notification sent to the display causes the at least one perimeter light of the display to light up as a predetermined color,
- wherein the predetermined color is a first color if the notification is considered of low importance or no importance, wherein the predetermined color is a second color if the notification is considered of medium importance, and the predetermined color is a third color if the notification is considered of high importance,
- wherein the second color is yellow, and
- wherein the third color is red.

14. The display according to claim 11, wherein the shape has a geometric shape that is a quadrilateral, rounded-corner quadrilateral, oval, or ellipse, and
- wherein the notification causes a plurality of the perimeter lights of the shape to light up to convey that the notification information is relevant to more than one area of the host vehicle.

15. The display according to claim 11, wherein the notification causes a plurality of the perimeter lights of the shape to light up to convey that the notification information is relevant to more than one area of the host vehicle.

16. The display according to claim 11, wherein the display is disposed on a dynamic surface such that a rotational position, an absolute position, or both of the shape changes, and
- wherein the display is configured such that the perimeter lights are dynamic such that the perimeter lights transition with the dynamic surface such that the perimeter lights always respectively represent areas of the host vehicle based on a view of the shape by the occupant.

17. A system for providing warnings and notifications to an occupant in a host vehicle, the system comprising:
- a display comprising a shape that corresponds to an overhead view of the host vehicle, and perimeter lights around a perimeter of the shape, the perimeter lights respectively corresponding to areas of the host vehicle;
- a processor in operable communication with the display; and a storage medium in operable communication with the processor and having an application stored thereon that, when executed by the processor, causes the processor to:
- receive host vehicle information from the host vehicle; and send a notification to the display based on the host vehicle information received, causing at least one perimeter light of the display to light up in a manner that conveys notification information to the occupant of the vehicle based on the location of the at least one perimeter light,
- wherein the host vehicle is an electric vehicle, wherein the notification sent to the display is an Advanced Driver Assistance System (ADAS) warning, wherein the display comprises exactly 8, exactly 16, exactly 64, or exactly 128 perimeter lights, wherein the notification sent to the display causes the at least one perimeter light of the display to flash at a predetermined frequency,
- wherein the predetermined frequency is a first frequency if the notification is considered of low importance or no importance, wherein the predetermined frequency is a second frequency if the notification is considered of medium importance, and the predetermined frequency is a third frequency if the notification is considered of high importance,
- wherein the second frequency is faster than the first frequency, and the third frequency is faster than the second frequency,
- wherein the notification sent to the display also causes an audio alarm to be engaged within the host vehicle,
- wherein the notification sent to the display causes the at least one perimeter light of the display to light up as a predetermined color,
- wherein the predetermined color is a first color if the notification is considered of low importance or no importance, wherein the predetermined color is a second color if the notification is considered of medium importance, and the predetermined color is a third color if the notification is considered of high importance, wherein the second color is yellow, wherein the third color is red, wherein the shape has a geometric shape that is a quadrilateral, rounded-corner quadrilateral, oval, or ellipse,
- wherein the notification sent to the display causes a plurality of the perimeter lights of the display to light up to convey that the notification information is relevant to more than one area of the host vehicle, wherein each of the perimeter lights comprises at least one light bulb, at least one light emitting diode (LED), a plurality of pixels on a digital screen, or a combination thereof, wherein the display is disposed on a steering wheel of the host vehicle, an instrument cluster of the host vehicle, a center display of the host vehicle, a heads-up display of the host vehicle, a dedicated surface of the host vehicle for providing warnings, a key-fob, or a smartphone screen, wherein the display is disposed on a dynamic surface such that a rotational position, an absolute position, or both of the shape changes, wherein the system is configured such that the perimeter lights are dynamic such that the perimeter lights transition with the dynamic surface such that the perimeter lights always respectively represent areas of the host vehicle based on a view of the shape by the occupant, wherein the system further comprises at least one sensor in operable communication with the processor, the at least one sensor being configured to obtain the host vehicle information and provide the host vehicle information to the processor, and wherein the at least one sensor comprises at least one of radar, a front-facing camera, a rear-facing camera, a side-facing camera, an ultrasonic sensor, and lidar;

wherein the perimeter lights comprise at least 8 perimeter lights comprising a first perimeter light at a top of the shape and representing a front of the host vehicle, a second perimeter light at a bottom of the shape and representing a back of the host vehicle, a third perimeter light at a left side of the shape and representing a left side of the host vehicle, a fourth perimeter light at a right side of the shape and representing a right side of the host vehicle, a fifth perimeter light at a top-left corner of the shape and representing a top-left corner of the host vehicle, a sixth perimeter light at a top-right corner of the shape and representing a top-right corner of the host vehicle, a seventh perimeter light at a bottom-left corner of the shape and representing a bottom-left corner of the host vehicle, and an eighth perimeter light at a bottom-right corner of the shape and representing a bottom-right corner of the host vehicle.

* * * * *